No. 643,620. Patented Feb. 20, 1900.
E. E. BELL.
CENTRIFUGAL CREAM SEPARATOR.
(Application filed Dec. 23, 1898.)
(No Model.) 3 Sheets—Sheet 1.
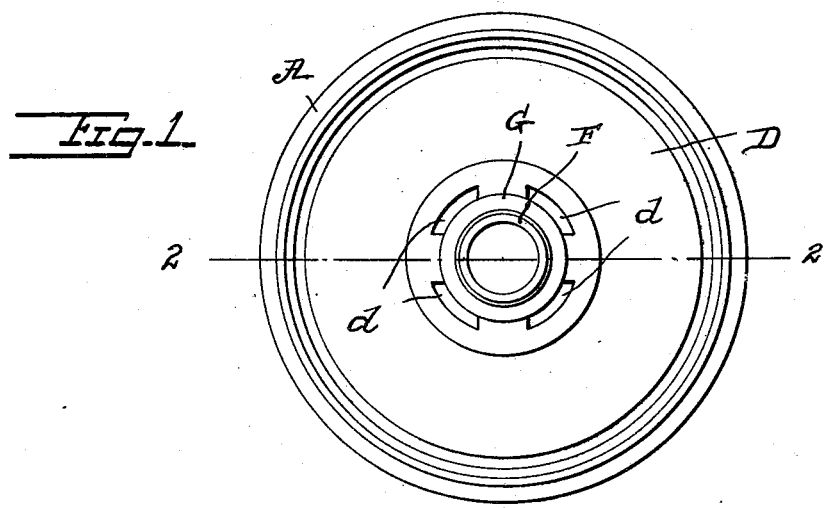
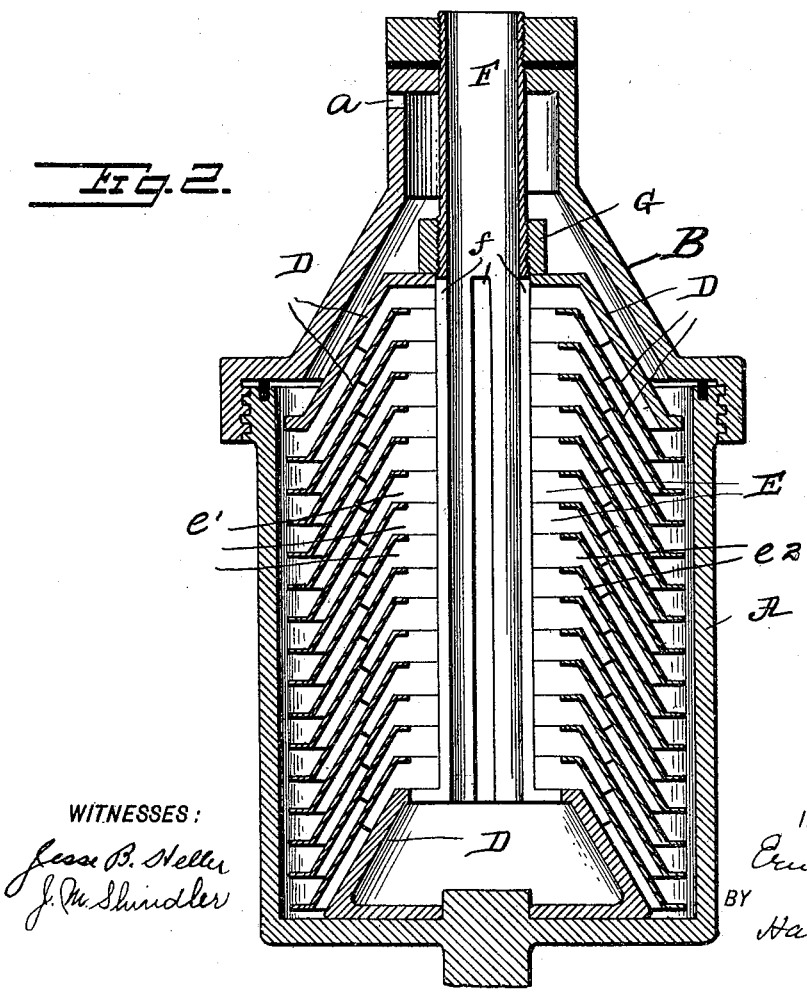
WITNESSES: INVENTOR
Jesse B. Neller Ernest E. Bell
J. M. Shindler BY
Harding & Harding
ATTORNEY.

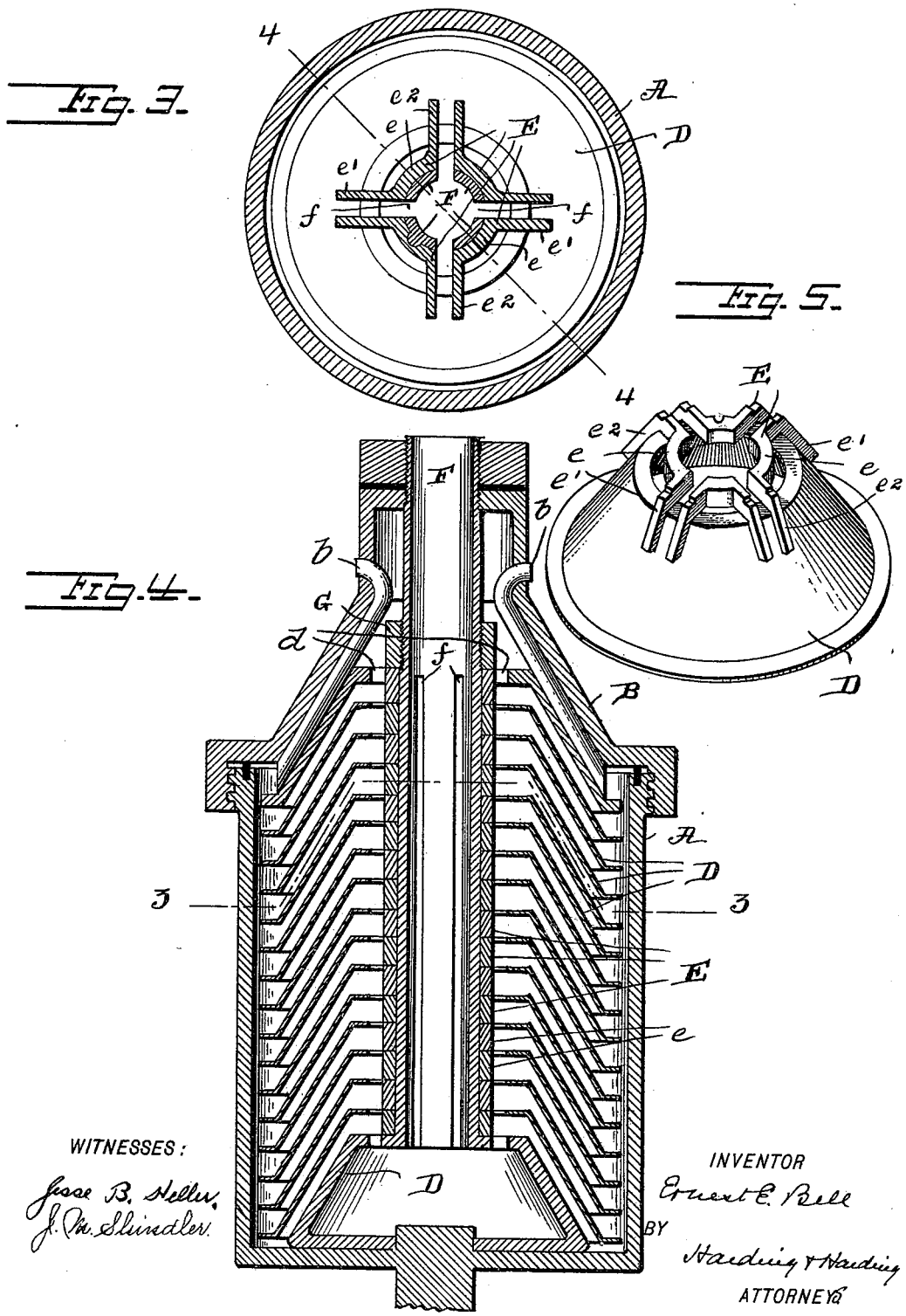

No. 643,620. Patented Feb. 20, 1900.
E. E. BELL.
CENTRIFUGAL CREAM SEPARATOR.
(Application filed Dec. 23, 1898.)
(No Model.) 3 Sheets—Sheet 3.
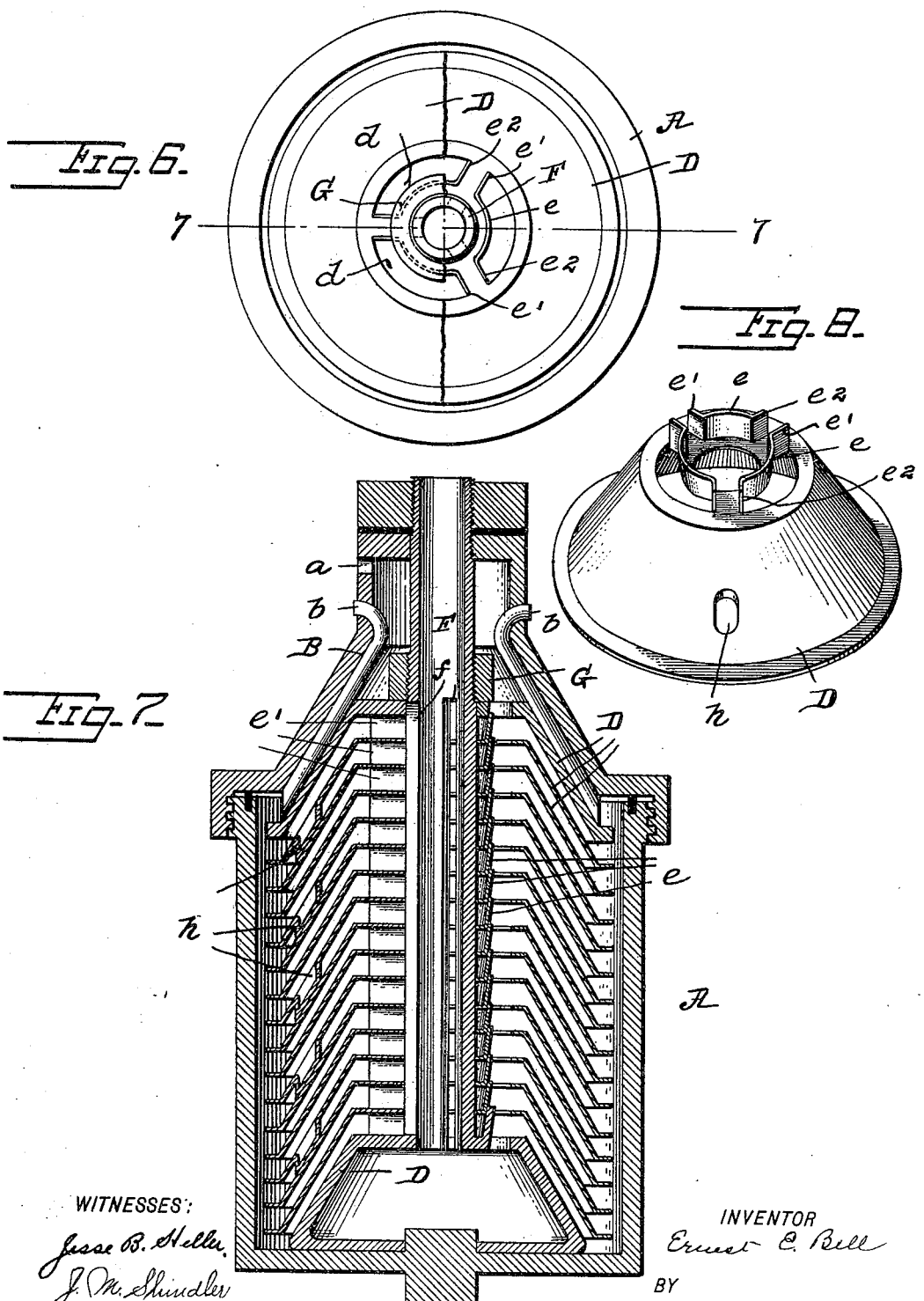
WITNESSES:
Jesse B. Heller.
J. M. Shindler
INVENTOR
Ernest E. Bell
BY
Harding & Harding
ATTORNEYS

UNITED STATES PATENT OFFICE.

ERNEST E. BELL, OF NEWARK, NEW JERSEY, ASSIGNOR TO THE DE LAVAL SEPARATOR COMPANY, OF NEW JERSEY.

CENTRIFUGAL CREAM-SEPARATOR.

SPECIFICATION forming part of Letters Patent No. 643,620, dated February 20, 1900.

Application filed December 23, 1898. Serial No. 700,091. (No model.)

*To all whom it may concern:*

Be it known that I, ERNEST E. BELL, a citizen of the United States, residing at Newark, county of Essex, and State of New Jersey, have invented a new and useful Improvement in Centrifugal Cream-Separators, of which the following is a full, clear, and exact description, reference being had to the accompanying drawings, which form a part of this specification.

My invention is adapted to that class of cream-separators in which the bowl is provided with a series of superposed inclined disks which intersect the radial line of the bowl, and has for its object a construction for feeding the full milk, so that it shall be delivered evenly and beyond the cream wall or zone.

The invention can be best understood by reference to the accompanying drawings, in which—

Figure 1 is a plan view of the bowl with cover removed. Fig. 2 is a section on line 2 2, Fig. 1. Fig. 3 is a section on line 3 3, Fig. 4. Fig. 4 is a section on line 4 4, Fig. 3. Fig. 5 is a perspective view of disk and frames. Fig. 6 is a plan view of bowl with modified form of frame, with cover removed and top disk partially broken away. Fig. 7 is a section on line 7 7, Fig. 6. Fig. 8 is a perspective view of modified form of frame.

Referring to the construction shown in Figs. 1 to 5, A is the bowl; B, the cover; *a* is the cream-discharge outlet; *b*, the skim-milk discharge-outlet; D are a series of superposed inclined disks having with the exception of the top disk a central opening. The top disk is solid, except the orifices *d* within the cream zone to allow the discharge of the cream. These disks are a series of frames E, having a curved body portion *e* and projecting legs $e'$ $e^2$ from each end of said portion. The frame is secured to the disks D by soldering or otherwise securing the legs $e'$ $e^2$ to said disks. The legs $e'$ $e^2$ will also act when secured to the disk as spacing projections to properly space the disks apart. I have shown four of these frames, although any number may be used. These frames are placed upon the disks so as to leave a space between adjacent frames. By reference to Fig. 5 it will be seen that when these frames are in position there is formed a central orifice with projecting channels leading therefrom. When the disks D are placed one upon another, the frames E will overlie each other and a central and two sets of vertical passages will be formed. Of the two latter sets of vertical passages one is between adjacent frames and the other is between the legs of the frames. The passage between the frames is closed by the top disk, while the passage between the legs of the frames is in alinement with the orifices *d* in the top disk. F is a tubular shaft secured to the lower disk D, provided with vertical slits or orifices *f*. The curved body portions *e* of the frames E closely hug the exterior of the bolt F, and the slits *f* register with the channels or passages between the frames to lead the incoming milk from the slits *f*. The tubular shaft F extends beyond the bowl and cover and has a threaded end, upon which threaded end a nut G works. By forcing the nut down the disks D and frame E will be forced together.

In operation the full milk is fed through the tubular shaft F and escapes into the bowl through the slits *f* and through the passages between adjacent frames, being delivered between the disks D. The cream will pass up through the passage formed in the superposed frames.

In the construction shown in Figs. 6, 7, and 8 the only difference from that of Figs. 1 to 5 consists in forming the frames E out of, as it were, the disks D themselves. The length of the disks is made greater than the disk proper would be, the excess being cut and bent to form frames. (See Fig. 8.) In this form, if desired, spacing projections *h* may be placed upon the disks.

Having now fully described my invention, what I claim, and desire to protect by Letters Patent, is—

1. In a centrifugal cream-separator, in combination with the bowl and superposed inclined disks, of a plurality of frames secured to and extending inward from the disks, there being passages formed between adjacent frames and passages formed by superposed frames.

2. In a centrifugal cream-separator, in combination with the bowl and superposed inclined disks, of a plurality of frames secured to and extending inward from the disks, there being passages formed between adjacent frames and passages formed by superposed frames, the frames of the superposed disks overlying each other, and means to force the frames of the superposed disks into close contact.

3. In a centrifugal cream-separator, in combination with the bowl and superposed inclined disks, of a plurality of frames secured to and extending inward from the disks, there being passages formed between adjacent frames and passages formed by superposed frames, the frames of the superposed disks overlying each other, a hollow bolt extending through said bowl secured to the lower disk, said bolt being provided with vertical slots corresponding to the passages between adjacent frames, the upper end of said bolt being threaded and a nut working in said threaded end.

4. In a centrifugal cream-separator, in combination with the bowl and superposed inclined disks, of a plurality of frames secured to and extending inward from the disks, there being passages formed between adjacent frames and passages formed by superposed frames, a tube in connection with the milk-supply, extending through said bowl, said tube being provided with vertical slots corresponding to the passages between adjacent frames.

5. In a centrifugal cream-separator, in combination with the bowl and superposed inclined disks provided with spacing projections, of a tubular shaft extending through said bowl secured to the lower disk, the upper end of said bolt being threaded and a nut working on said threaded end and resting upon the top disk whereby said disks are compressed together.

In testimony of which invention I have hereunto set my hand at New York, N. Y., on this 17th day of December, 1898.

ERNEST E. BELL.

Witnesses:
GEO. R. REMINGTON,
J. J. BERRIGAN.